3,053,873
PROCESS FOR PRODUCING CHLOROALKYL-
SILICON COMPOUNDS
Enrico J. Pepe, Kenmore, N.Y.
No Drawing. Filed May 28, 1959, Ser. No. 816,381
5 Claims. (Cl. 260—448.2)

This invention relates to a new and improved process for producing chloroalkylsilicon compounds. More particularly, this invention relates to a new and improved Grignard type method for producing chloroalkylsilicon compounds wherein the chlorine atom is in the omega position and is interconnected to silicon through a carbon chain of at least 4 carbon atoms.

The preparation of omega chloroalkylsilanes is known in the art. These omega-chloroalkylsilicon compounds can be prepared by the chlorination of the corresponding alkylsilanes in the presence of ultraviolet light. This method of preparation has the disadvantage in that the chlorine group does not always add to the omega carbon atom of the alkyl group but adds to various positions along the chain, thus rendering it highly difficult to isolate the chloroalkylsilanes in a high state of purity.

The omega-chloroalkylsilanes can also be prepared by the reaction of an alkylsilane with sulfuryl chloride under the influence of benzoyl peroxide. This method also has the disadvantage that more than one isomer of the chloroalkylsilane is obtained. Furthermore, when more than one alkyl group is bonded to silicon it becomes increasingly more difficult to isolate any of the omega-chloroalkylsilanes.

Heretofore, when one attempted to prepare a half Grignard compound of an alpha-omega-chlorohaloalkane of the formula $Cl-(CH_2)_a-Y$ where $(a)$ is an integer of greater than 3 and Y is chlorine or bromine, the result was the formation of a di-Grignard, i.e., both the halo and the chloro groups of the chloro-halo alkane reacted with magnesium or a coupling reaction wherein the chloro-halo alkane reacted with magnesium and then almost instantly reacted either with another molecule of the chloro-halo alkane to form a linear compound or with the remaining halo or chloro group of the same molecule to produce a cyclic alkane.

I have discovered that omega-chloroalkylsilane of the formula:

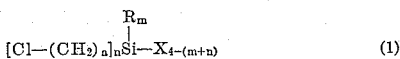  (1)

where R is a monovalent hydrocarbon radical or a halo or cyano-substituted monovalent hydrocarbon radical group, X is a hydrolyzable group such as chlorine, alkoxy or aryloxy, $(a)$ is an integer of greater than 3, $(n)$ is an integer of from 1 to 4, $(m)$ is an integer of from 0 to 3 and the sum of $m+n$ is never more than 4, can be prepared by the reaction of a half-Grignard compound of the formula $Cl(CH_2)_aMgY$, where Y and $(a)$ are as above defined, with a silane of the formula $R_mSi-X_{4-m}$ where R, X and $(m)$ have the above-defined meanings. Illustrative of the monovalent hydrocarbon radicals that R may represent are, alkyl radicals such as methyl, ethyl, propyl, undecyl and the like; aryl groups such as phenyl, phenylethyl, tolyl and the like; alkenyl groups such as vinyl, allyl, butenyl and the like; alicyclic groups such as cyclohexyl, and the like. Illustrative of the cyano-substituted monovalent hydrocarbon radicals that R may represent are butyl and the like; cyanoaryl groups such as meta-cyanophenyl and the like. Illustrative of the halo-substituted monovalent hydrocarbon radicals that R may represent are haloalkyl such as gamma-chlorobutyl, delta-chlorobutyl and the like; haloaryl such as meta-bromophenyl and the like.

The reaction procedure is essentially as follows:

An alpha, omega-chloro-halo alkane of the formula $Cl(CH_2)_a-Y$ where $(a)$ and Y are as above defined, is reacted with magnesium in the presence of a solvent to form the half Grignard compound of the formula:

  (2)

where $(a)$ and Y have the above-defined meanings, at a temperature which minimizes or substantially prevents the formation of a di-Grignard compound. The half-Grignard compound is then reacted with a silane of the formula:

  (3)

where R, X, and $(m)$ have the above-defined meanings, while maintaining the temperature at from $-10°$ C. to $20°$ C.

The reaction can be conducted as a two-step procedure as illustrated above or it can be carried out in a single step by forming the half-Grignard compound in the presence of the silane of Formula 3.

In the process of my invention, I have found that if the Grignard reaction is initiated at approximately 25–35° C. and the reaction mixture almost immediately cooled to from about 13 to 17° C. by means of an ice bath and maintained at the lower temperature for the remainder of the reaction undesirable side reactions such as the half-Grignard reaction with itself, can be reduced to a minimum to give higher yields of the half-Grignard reagent.

I have also found that increased yield of the omega chloroalkylsilane can be obtained where the temperature of reaction of the addition of the half-Grignard compound to the silanes of Formula 3 is maintained below 25° C. during the addition. It is preferred that the temperature of reaction of the half-Grignard compound and the silane be in the range of from about 10° C. to 20° C.

The addition of the half-Grignard compound to the silane is preferably done in drop-wise manner with rapid stirring in order to enable one to maintain the temperature of the half-Grignard compound-silane reaction within the above-defined limits, thus substantially reducing any side reaction.

Activators such as have been employed heretofore to initiate Grignard formation may be used to substantially shorten the induction period for the preparation of the half-Grignard compound. Such activators are, for example, iodine, bromine, alkyl bromide, alkyl iodines, alkyl magnesium halides and aryl magnesium halides. The amount of such activators employed is not narrowly critical and is well within the knowledge of those skilled in the art.

Solvents that are commonly employed in the preparation of Grignard reagents are useful in the process of this invention. The amounts of such solvents employed is not narrowly critical and is well within the knowledge of those skilled in the art. Such solvents, are, for example, aliphatic or cyclic ethers such as diethyl ether, diisopropyl ether, dioxane, tetrahydrofuran and the like; tertiary amines such as triethylamine dimethylaniline and the like; glycol and polyglycol ethers such as monoethylene glycol dimethylether, di-ethylene glycol dimethylether, di-ethylene glycol di-ethylether and the like. It is preferred that diethyl ether be employed as the solvent for the process of this invention.

Since is it desired to react one halo group of the alpha-omega-chlorohalo alkane with magnesium to produce one mole of the half-Grignard compound, one mole of the alpha-omega-chlorohalo alkane is employed in the reaction for each mole of magnesium employed.

The amount of the half-Grignard compound employed is dependent upon the number of hydrolyzable groups desired to be substituted for in the silane. Thus, for example, if it is desired to substitute one hydrolyzable group of the silane, equal molar ratios of the silane and the half-Grignard compound are employed. Correspondingly, if more than one hydrolyzable group is to be replaced in the silane, the molar ratio of the silane to the half-Grignard compound is decreased.

The alpha-omega-chlorohalo alkanes which may be employed in the process of this invention are those of the formula $Cl-(CH_2)_aY$, where ($a$) and Y are as above defined. Illustrative of sucsh chlorohalo alkanes are 1,4-dichlorobutane, 1,5-dichloropentane, 1-chloro-4-bromobutane, 1,6-dichlorohexane, 1,7-dichloroheptane, 1,11-dichloroundecane and the like. It is preferred that the chlorohaloalkanes contain from 4 to 10 carbon atoms.

The magnesium metal employed is preferably employed in a form so as to provide a maximum of surface to facilitate reaction. Thus, we prefer to employ magnesium in the form of powder or turnings.

The omega-chloroalkylsilanes produced by the process of this invention are useful in the preparation of polysiloxane oils, gums and resins by known hydrolysis procedures. Such polysiloxane oils are useful as lubricants; such resins are useful as coating compositions.

The following examples serve to further illustrate the invention and are not to be construed as limitations thereon.

Example 1

Into a 3-liter, 3-necked flask fitted with stirrer, condenser, thermometer and dropping funnel was placed magnesium turnings (73 g., 3 moles). The entire system was dried by heating with a Bunsen burner flame under argon purge to remove all traces of moisture. On cooling anhydrous diethyl ether (1300 ml.) was added to the 3-liter flask. The dropping funnel was charged with anhydrous 1,4-dichloro butane (381 g., 3 moles) containing dissolved therein a crystal of iodine (about 0.2 g.). About 10 ml. of the 1,4-dichlorobutane was run into the flask. The reaction was initiated by applying heat to the flask causing the ether solvent to reflux. Such initiation required from 5 to 15 minutes reflux. When reaction became vigorous, the flask was placed into a Dry-Ice acetone bath in order to maintain a reaction temperature of below 25° C. throughout the balance of 1,4-dichlorobutane addition. Additional stirring was continued until the Mg was consumed and the reaction mixture became a clear, brown, syrupy liquid (1–2 hours at 15–25° C.). The reaction mixture was decanted from any residual solids into a suitable container.

Example 2

Into a 5-liter, 3-necked flask fitted with stirrer, condenser, thermometer and dropping funnel was charged gamma-cyanopropyltrichlorosilane (500 g., 2½ moles) and anhydrous diethyl ether (1300 ml.). The dropping funnel was charged with the half-Grignard in diethyl ether, prepared as described in Example 1 from 1,4-dichlorobutane (381 g., 3 moles) and magnesium (73 g., 3 moles). Addition of the half-Grignard to the rapidly stirred chlorosilane was made over 1 hour while maintaining the temperature at from about 5° C. to 15° C. The mixture was stirred while warming to 25° C. (1 hour), diluted with 800 ml. of petroleum ether and stirred for 16 hours at 25° C. An excess of absolute ethanol (500 ml.) over that required to react with the silicon-bonded chlorines was added with rapid stirring at reduced pressure (50 to 100 mm. Hg) over a 1 hour period. Stripping at reduced pressure (approximately 20 mm. Hg) removed ether solvent and any residual alcohol yielding a residue. Flash distillation of the residue through a 50 cm. Vigreaux column gave 207 g. of a fluid distillate. The distillate was charged to a 500 ml. distillation flask with 100 ml. of tri-ethylorthoformate. The mixture of the distillate and the triethylorthoformate was heated to reflux for 1 hour, stripped of low boiling materials, and fractionally distilled at reduced pressure to give 66 g. of pure

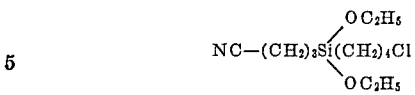

B.P. 122–4° C./0.3 mm., Hg; $n_d^{25}$ 1.4492.

Calc. for $C_{12}H_{24}SiO_2NCl$: 51.9% C; 8.7% H; 10.1% Si; 5.0% N; 12.8% Cl. Found: 52.5% C; 8.8% H; 10.1% Si; 4.9% N; 12.1% Cl.

The structure was verified by infrared analysis.

Example 3

Into a 2-liter, 3-necked flask fitted with condenser, thermometer, stirrer, dropping funnel and heating mantle were placed silicon tetrachloride (85 g., 0.5 mole); magnesium (24.3 g., 1 mole); and anhydrous diethyl ether (700 ml.). A crystal of iodine (about 0.1 g.) was dissolved in 1,4-dichloro butane (127 g., 1 mole) and the 1,4-dichlorobutane charged into the dropping funnel. Adding approximately 20 ml. of the 1,4-dichlorobutane to the ether-magnesium-silicon tetrachloride mixture followed by heating of the resultant mixture to about 35° C. was sufficient to initiate the reaction of the 1,4-dichlorobutane with the magnesium in from 10 to 15 minutes. The remainder of the dihalide was added to the ether-magnesium-silicon tetrachloride mixture over 1½ hours while heating the reaction mixture to reflux (ca 35° C.). On cooling, the reaction mixture was filtered free of white solids, stripped of ether and refiltered through an inorganic filter aid. Distillation of the filtrate at reduced pressure gave 26 g. of 4-chlorobutyltrichlorosilane; B.P. 205° C.; $n^{25}$ 1.4685; Hydrol Cl, 46.5%; Hydrolyzable Cl, 46.9% (theory). A higher boiling fraction B.P. 114° C./0.8 mm. weighed 16 g. and was identified as the di(4-chlorobutyl)dichlorosilane $[Cl-(CH_2)_4]_2SiCl_2$; B.P. 114° C./0.8 mm.; 24.6% Hydrolyzable Cl (25.0% theory).

Example 4

Into a 5-liter, 3-necked flask fitted with stirrer, thermometer, condenser and dropping funnel containing 2 liters of an ether solution of $Cl-(CH_2)_4MgCl$ (prepared by reacting together 3 moles of 1,4-dichlorobutane and 3 moles of magnesium) was placed 3-chlorobutyltrichlorosilane, $Cl-CH_2-CH(CH_3)CH_2SiCl_3$ (610 g., 2.7 moles) dissolved in approximately 1400 ml. of anhydrous diethyl ether. The ether - 3 - chlorobutyltrichlorosilane mixture was cooled to 15° C. and addition of the half-Grignard made at a steady rate with vigorous stirring while maintaining the temperature of the addition and reaction at from about 10° C. to 20° C. by means of an ice-bath. Additional stirring for 6–16 hours, filtering, washing of the filter cake with ether and distillation of the combined filtrate and ether wash gave a product B.P. 118–130° C./1.0–5.0 mm. Hg. Redistillation of the product through a Vigreaux column gave 3-chlorobutyl-4-chlorobutyldichlorosilane

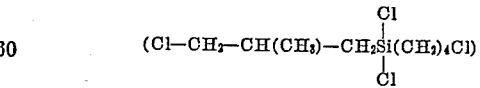

B.P. 98–99° C./0.4 mm., $n^{25}$ 1.4850.

Calc. for $C_8H_{16}SiCl_4$: 9.9% Si; 50.3% Cl. Found: 10.0% Si; 50.2% Cl.

Example 5

Into a 1-liter, 3-necked flask fitted with stirrer, dropping funnel and condenser with thermometer were placed 3-chlorobutyl-4-chlorobutyldichlorosilane

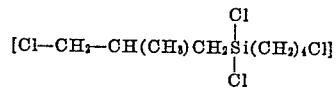

(237 g., 0.84 mole) and anhydrous diethyl ether (200 ml.). Addition of 92 g. (2.0 moles) of absolute ethanol was made to the ether-silane mixture over a 10 minute period. The addition was much under reduced pressure (50–100 mm. Hg) to remove byproduct HCl. The resultant mixture was stirred rapidly and was heated to about 40° C. at reduced pressure (50 g., 100 mm. Hg) for 15 minutes at which point an additional 25 ml. of ethanol was added. The heating at 40° C.+5° C. was continued for 15 minutes at reduced pressure (20 to 30 mm. Hg) with rapid stirring, to remove residual HCl and ethanol. On cooling 200 ml. of ether was added to form an ethereal solution and anhydrous ammonia bubbled into the solution for 15 minutes. Upon the addition of the ammonia sufficient heat was evolved to reflux the ether. The ethereal solution was filtered to remove ammonium chloride. The filtrate was stripped of low boiling materials at reduced pressure. Reduced pressure distillation of the residue gave the pure 3-chlorobutyl-4-chlorobutylethoxysilane

[Cl—CH$_2$—CH(CH$_3$)—CH$_2$—Si(OEt)$_2$—(CH$_2$)$_4$Cl]

B.P. 110° C./0.5 mm. Hg; $n_D^{25}$ 1.4513.

Calc. for C$_{12}$H$_{26}$SiO$_2$Cl$_2$: 47.8% C; 8.7% H; 9.3% Si; 23.5% Cl; 29.8% OEt. Found: 48.4% C; 8.3% H; 9.2% Si; 21.5% Cl; 30.9% OEt.

Thus, having described the invention, what applicant claims is:

1. A process for the production of an omega-chloroalkylsilane of the formula:

$$[Cl(CH_2)_a]_n \overset{R_m}{\underset{|}{Si}}—X_{4-(m+n)}$$

wherein R is selected from the group consisting of monovalent hydrocarbon radicals, chlorine-substituted monovalent hydrocarbon radicals, and cyano substituted monovalent hydrocarbon radicals, X is selected from the group consisting of alkoxy groups, aryloxy groups and chlorine, (a) is an integer having a value of greater than 3, (m) is an integer of from 0 to 3, (n) is an integer of from 1 to 4 and the sum of (m+n) is from 1 to 4 which comprises:

(1) forming an admixture of magnesium and a solvent, adding to said admixture a minor amount of a chlorohaloalkane of the formula Cl(CH$_2$)$_a$Y wherein (a) is as above-defined and Y is selected from the class consisting of chlorine and bromine while heating said admixture to a temperature of from 25° C. to 35° C. to initiate the reaction of said chlorohaloalkane and said magnesium and then cooling the admixture to a temperature below 25° C. and thereafter maintaining the mixture at a temperature below 25° C. while adding an additional amount of chlorohaloalkane so that the total amount of said chlorohaloalkane added is equivalent to one mole of said chlorohaloalkane for each mole of magnesium present, to produce a half-Grignard compound;

(2) reacting said half-Grignard compound with a silane of the formula R$_m$Si—X$_{4-m}$ wherein R and (m) are as above-defined while maintaining the reaction at a temperature of from about 10 to 20° C. to produce said omega-chloroalkylsilane.

2. A process for the production of an omega-chloroalkylsilane of the formula:

$$[Cl(CH_2)_a]_n \overset{R_m}{\underset{|}{Si}}—X_{4-(m+n)}$$

wherein R is selected from the group consisting of monovalent hydrocarbon radicals, chlorine-substituted monovalent hydrocarbon radicals, and cyano-substituted monovalent hydrocarbon radicals, X is selected from the group consisting of alkoxy groups, aryloxy groups and chlorine, (a) is an integer having a value of greater than 3, (m) is an integer of from 0 to 3, (n) is an integer of from 1 to 3 and the sum of (m+n) is from 1 to 4 which comprises forming a mixture of a silane of the formula R$_m$Si—X$_{(4-m)}$ wherein R and (m) have the above-defined meanings, and magnesium in the presence of a solvent and adding a minor amount of chlorohaloalkane of the formula Cl(CH$_2$)$_a$Y wherein (a) has the above-defined meaning and Y is selected from the group consisting of bromine and chlorine groups and heating to a temperature of about 35° C. to initiate the reaction and thence adding an additional amount of said chlorohaloalkane the total amount of said chlorohaloalkane added being equivalent to one mole of said chlorohaloalkane for each mole of magnesium present, while maintaining the mixture at a temperature of about 35° C., thereby causing said magnesium, said chlorohaloalkane and said silane react to produce said omega-chloroalkylsilane.

3. A process for the production of a delta-chlorobutylsilane of the formula:

$$[Cl(CH_2)_4]_n \overset{R_m}{\underset{|}{Si}}—X_{4-(m+n)}$$

wherein R is selected from the group consisting of monovalent hydrocarbon radicals, chlorine-substituted monovalent hydrocarbon radicals, and cyano substituted monovalent hydrocarbon radicals, X is selected from the group consisting of alkoxy groups, aryloxy groups and chlorine, (m) is an integer of from 0 to 3, (n) is an integer of from 1 to 4 and the sum of (m+n) is from 1 to 4 which comprises:

(1) forming an admixture of magnesium and a solvent, adding to said admixture a minor amount of a chlorohalobutane of the formula Cl(CH$_2$)$_4$Y wherein Y is selected from the class consisting of chlorine and bromine while heating said admixture to a temperature of from 25° C. to 35° C. to initiate the reaction of said chlorohalobutane and said magnesium and then cooling the admixture to a temperature below 25° C. and thereafter maintaining the mixture at a temperature below 25° C. while adding an additional amount of said chlorohalobutane so that the total amount of said chlorohalobutane added is equivalent to one mole of said chlorohalobutane for each mole of magnesium present to produce a half-Grignard compound;

(2) adding said half-Grignard compound to a silane of the formula R$_m$Si—X$_{4-m}$ wherein R and (m) are as above-defined while maintaining the reaction mixture at a temperature of from about 10 to 20° C. to produce said delta-chlorobutylsilane.

4. A process for the production of a delta-chlorobutylsilane of the formula:

$$[Cl(CH_2)_4]_n \overset{R_m}{\underset{|}{Si}}—X_{4-(m+n)}$$

wherein R is selected from the group consisting of monovalent hydrocarbon radicals, chlorine-substituted monovalent hydrocarbon radicals, and cyano-substituted monovalent hydrocarbon radicals, X is selected from the group consisting of alkoxy groups, aryloxy groups and chlorine, (m) is an integer of from 0 to 3, (n) is an integer of from 1 to 3 and the sum of (m+n) is from 1 to 4 which comprises forming a mixture of a silane of the formula R$_m$Si—X$_{(4-m)}$ wherein R and (m) have the above-defined meanings, and magnesium in the presence of a solvent and adding a minor amount of chlorohalobutane of the formula Cl(CH$_2$)$_4$Y wherein Y is selected from the group consisting of bromine and chlorine groups and heating to initiate the reaction and thence adding an additional amount of said chlorohalobutane, the total molar amount of the chlorohalobutane added being equivalent to the number of moles of magnesium employed while maintaining the mixture at a temperature of about 35° C. thereby causing said magnesium, said chlorohalobutane and said silane to react to produce said delta-chlorobutylsilane.

5. A process for the production of a delta-chlorobutylsilane of the formula:

$$[Cl(CH_2)_4]_n \overset{R_m}{\underset{|}{Si}}—X_{4-(m+n)}$$

wherein R is selected from the group consisting of monovalent hydrocarbon radicals, chlorine-substituted monovalent hydrocarbon radicals, and cyano-substituted monovalent hydrocarbon radicals, X is selected from the group consisting of alkoxy groups, aryloxy groups and chlorine, ($m$) is an integer of from 0 to 3, ($n$) is an integer of from 1 to 3 and the sum of ($m+n$) is from 1 to 4 which comprises forming a mixture of a silane of the formula $R_mSi-X_{(4-m)}$ wherein R and ($m$) have the above-defined meanings, and magnesium in the presence of a solvent and adding thereto a minor amount of 1,4-dichlorobutane and heating to a temperature of about 35° C. to initiate the reaction and thence adding an additional amount of said 1,4-dichlorobutane, the total molar amount of said 1,4-dichlorobutane added being equivalent to the number of moles of magnesium employed, maintaining the mixture at a temperature of about 35° C., thereby causing said 1,4-dichlorobutane and said silane to react to produce said delta-chlorobutylsilane.

References Cited in the file of this patent

UNITED STATES PATENTS

| | | |
|---|---|---|
| 2,066,198 | Buc | Dec. 29, 1936 |
| 2,464,685 | Hirsch | Mar. 15, 1949 |
| 2,561,429 | Sveda | July 24, 1951 |
| 2,572,943 | Miller et al. | Oct. 30, 1951 |
| 2,654,771 | Stelling et al. | Oct. 6, 1953 |
| 2,872,471 | Ramsden et al. | Feb. 3, 1959 |